United States Patent
Ebert et al.

[11] Patent Number: 5,840,365
[45] Date of Patent: Nov. 24, 1998

[54] METHOD AND APPARATUS FOR SPIN-COATING COMPACT DISCS

[75] Inventors: Andreas Ebert, La Grangeville, N.Y.; Abdul Ghafar, Fremont, Calif.

[73] Assignee: The Fairchild Corporation, Dulles, Va.

[21] Appl. No.: 797,819

[22] Filed: Feb. 7, 1997

[51] Int. Cl.⁶ ................................................ B05D 5/12
[52] U.S. Cl. ............................................................ 427/240
[58] Field of Search ............................... 427/240, 385.5; 118/52

[56] References Cited

U.S. PATENT DOCUMENTS

| | | | |
|---|---|---|---|
| 2,632,725 | 3/1953 | Marks et al. | 154/128 |
| 4,068,019 | 1/1978 | Boeckl | 427/82 |
| 4,075,974 | 2/1978 | Plows et al. | 118/52 |
| 4,086,870 | 5/1978 | Canavello et al. | 118/52 |
| 4,587,139 | 5/1986 | Hagan et al. | 427/130 |
| 4,775,550 | 10/1988 | Chu et al. | 427/38 |
| 4,838,979 | 6/1989 | Nishida et al. | 156/345 |
| 5,003,062 | 3/1991 | Yen | 437/231 |
| 5,013,586 | 5/1991 | Cavazza | 427/240 |
| 5,439,519 | 8/1995 | Sago et al. | 118/52 |
| 5,626,675 | 5/1997 | Sakamoto et al. | 118/663 |
| 5,660,634 | 8/1997 | Fujiyama et al. | 118/319 |

OTHER PUBLICATIONS

Patent Abstracts of Japan, vol. 095, No. 009, Oct. 31, 1995 & JP. 07 142378 A;(Tokyo Electron Ltd; Others: 01), Jun. 2, 1995.

Patent Abstract of Japan, vol. 013, No. 275 (C–610), Jun. 23, 1989 & JP 01 070168 A (Hitachi Ltd.), Mar. 15, 1989.c c Patent Abstracts of Japan, vol. 013, No. 024 (C–561), Jan. 19, 1989 & JP 63 229169 A (Hitachi Ltd.), Sep. 26, 1988.

Unknown, Patent Abstracts of Japan, vol. 097, No. 002, Feb. 28, 1997 & JP 08 273996 A (NEC Kansai Ltd.), Oct. 18, 1996.

Unknown, Patent Abstracts of Japan, vol. 097, No. 005, May 30, 1997 & JP 09 007918 A (M Setetsuku KK), Jan. 10, 1997.

*Primary Examiner*—Janyce Bell
*Attorney, Agent, or Firm*—Hickman & Martine, LLP

[57] ABSTRACT

Disclosed is a spinning chemical applicator for spin coating a work piece. The spinning chemical applicator includes a bowl having a base region and substantially curved walls. A chuck base having a chuck plate for holding the work piece, the chuck base and the chuck plate contained within an inner region of the bowl. A bowl covering lid being mounted on a top surface of the substantially curved walls. A plurality of upper venting holes being defined in the substantially curved walls, the plurality of upper venting holes defining a venting path to the inner region of the bowl. And plurality of venting drain holes defined in the substantially curved walls at an edge location that is substantially below each of the plurality of upper venting holes. The plurality of venting drain holes providing a venting and drain path for the inner region of the bowl.

30 Claims, 9 Drawing Sheets

METHOD AND APPARATUS FOR SPIN-COATING COMPACT DISCS

BACKGROUND OF THE INVENTION

1. Field of the Invention

The present invention relates generally to compact disc manufacturing, and more particularly, to methods and apparatuses for spin-coating materials over compact disc surfaces.

2. Description of the Related Art

Compact disc recordable (CDR) technology has received increased popularity due to increased consumer demands for storage devices having large storage capacities and fast reading and writing capabilities. Generally, CDR discs are similar to well known read-only compact discs (CDs) used in the music recording industry and computer software industry. However, fabricating CDR discs requires various processing steps that are dissimilar to those employed by CD manufactures. Initially, CDR disc manufactures use well known molding machines that are configured to receive a polycarbonate (i.e., plastic) material from one end and output a warm clear plastic disc at the other end. Once output from the molding machine, the discs are cooled and inspected for defects or abnormalities which may have been introduced during the molding process. If the polycarbonate disc meets quality control tolerances, the disc is moved to a chemical application station where a solvent based chemical is coated over the clear polycarbonate disc. Suitable well known solvent based chemicals may be obtained from CMR Technology, Inc., Trumble, Conn.

In "record once" recordable CDR technology, the solvent based chemical coated over the surface of the polycarbonate disc is a critical layer that typically defines the resulting performance ratings of recording and reading operations. The solvent based chemical generally acts as the programmable layer that changes characteristics when a recording laser is directed at the underside of the polycarbonate disc. Accordingly, during a subsequent reading operation, a reading laser is able to distinguish recorded regions from non-recorded regions by examining the reflected light from the reading laser.

Accordingly, the solvent based chemical applied over the polycarbonate disc must be extremely uniform in order to produce CDR discs that are sufficiently fast at both recording and subsequent reading operations. Therefore, if the solvent based chemical is applied in a non-uniform manner over the surface of the polycarbonate disc, the recording and reading responses will suffer and therefore produce a slower recording and reading CDR disc.

As is well known in the art, CDR discs are classified and marketed as either 2x, 4x, 6x, 8x, etc., depending the CDR disc's recording and reading speed. Although manufacturing costs associated with fabricating CDR discs having 2x, 4x, 6x, or 8x speeds are substantially equal, typical market prices for 2xdiscs are substantially lower than that of 8xdiscs. However, generating uniform solvent based chemical coatings over the surface of a polycarbonate disc has been found to be extremely challenging due to ripple causing turbulence effects and premature solvent-component evaporation during spin coating operations.

Figure 1A:
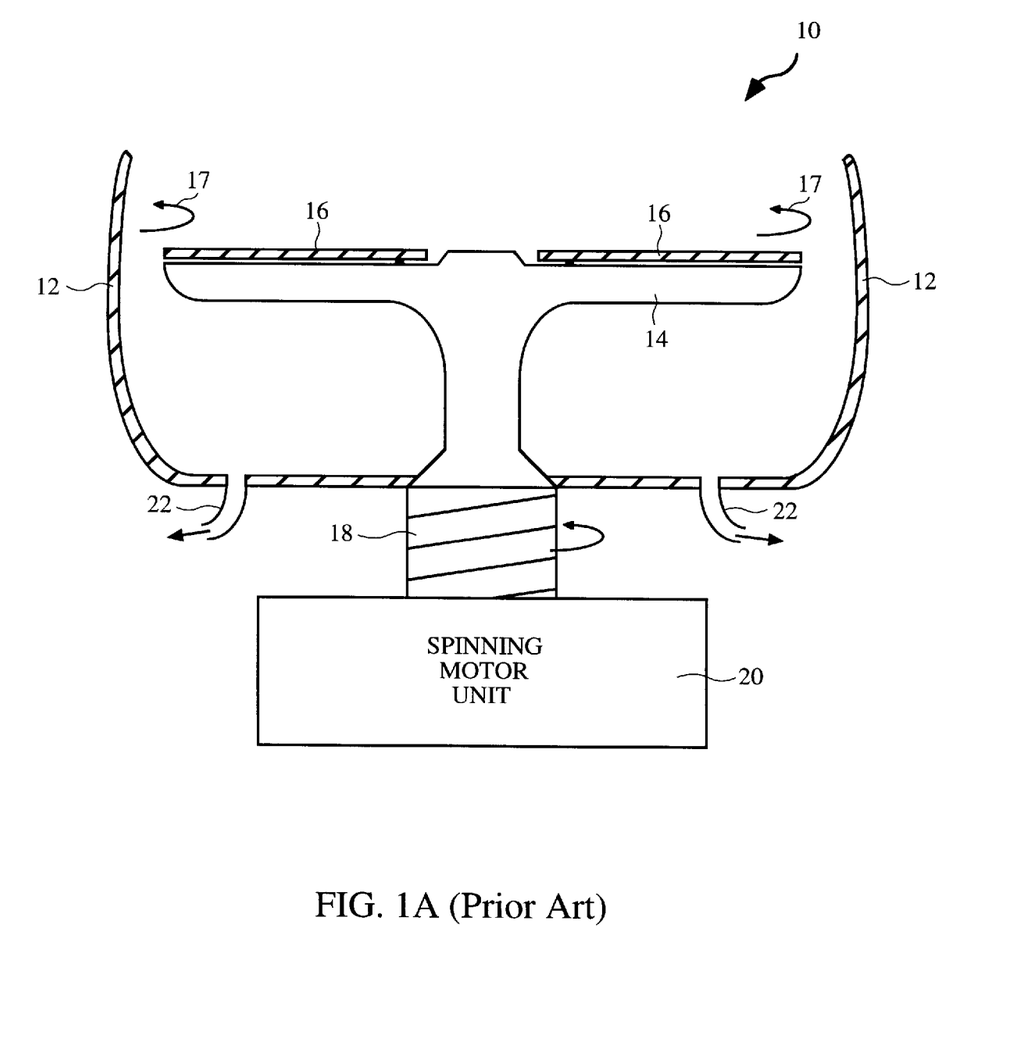
FIG. 1A illustrates a conventional open spinning chuck/bowl apparatus used for spin coating chemicals over disc surfaces.

FIG. 1A illustrates a conventional open spinning chuck/bowl 10 used for spin coating a solvent based chemical over the top surface of a disc 16. As shown, open spinning chuck/bowl includes a bowl frame 12 which surrounds an internal chuck 14 that holds disc 16 on its upper surface. Bowl frame 12 contains drain holes 22 located at a lower base region of bowl frame 12 for draining any excess material during the spin coating of the solvent based chemical over the surface of disc 16. In general, there are two types of conventional spin coating devices used in CDR technology. The first is a device that rotates both bowl frame 12 as well as chuck 14 in a clockwise or counterclockwise rotation as shown by rotation indicators 17. Typically, bowl frame 12 and chuck 14 are rotated by a spinning motor unit 20 shown coupled to a post 18. The second device is one where bowl frame 12 is a non-moving stationary bowl, while chuck 14 is rotated as shown by rotation indicators 17.

Unfortunately, it has been observed that applying the solvent based chemical in either device produces a number of non-uniformities over the surface of the spin coated solvent based chemical. It is believed that during the rotation of open spinning chuck/bowl 10, large disturbing turbulence pockets are spread over the top surface of disc 16 causing microscopic ripple effects. In addition, during the high speed rotation of disc 16, some solvent based chemical tends to splash-back off of the vertical walls of bowl frame 12. In some cases, the splashed-back material has been known to cause irreparable damage which makes the disc unsuitable for further CDR fabrication (i.e., rejects).

Figure 1B:
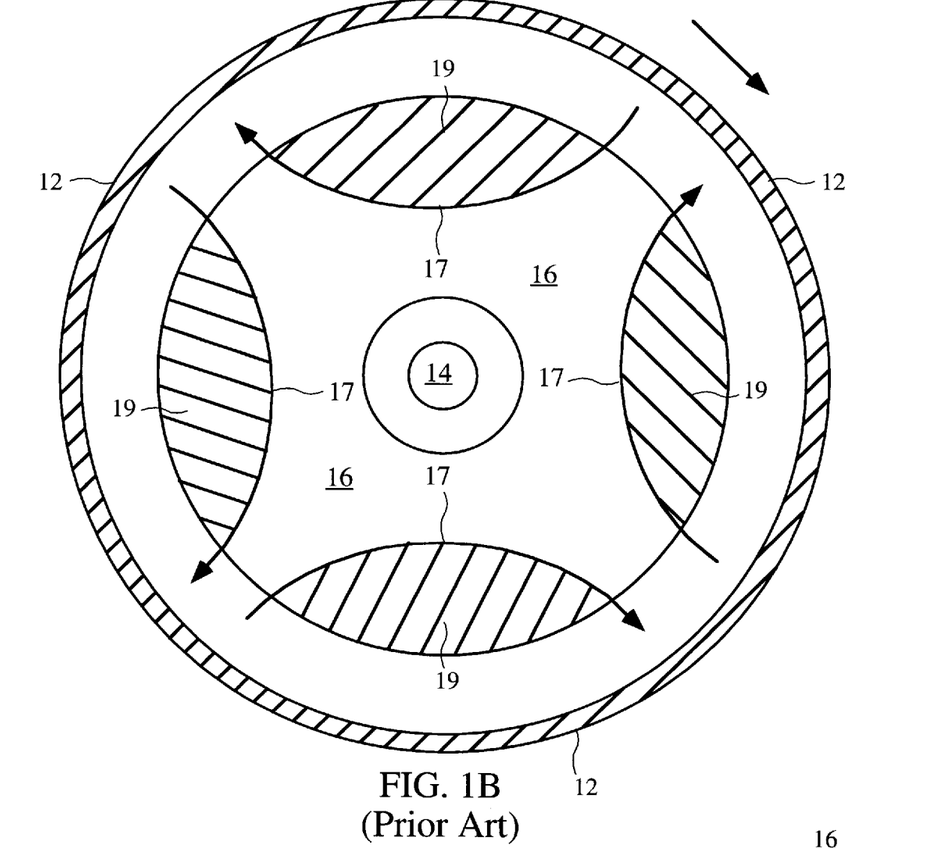
FIG. 1B is a top view representation of the conventional open spinning chuck/bowl apparatus of FIG. 1A.

FIG. 1B is a top view representation of the conventional open spinning chuck/bowl 10 of FIG. 1A. As shown, disc 16 is placed over chuck 14 and bowl frame 12 surrounds disc 16. In operation, rotation indicator 17 shows that bowl frame 12 as well as disc 16 that may be rotated at high speeds in order to spread a solvent based chemical that is applied as a circular bead at an inner radius of disc 16. As described above, during high speed rotation, various turbulence and splash-back events are believed to cause various non-uniformities over the surface of the spun-on solvent based chemical applied to disc 16. By way of example, exemplary turbulence ripple prone areas 19 are shown to occur near the edges of disc 16. In addition, a plurality of turbulence flow lines 17 are shown producing turbulence waves that bounce off of the walls of bowl frame 12 and back over the surface of disc 16. Unfortunately, the ripple prone areas 19 strongly contribute to quality reducing non-uniformities in CDR discs.

Figure 1C:
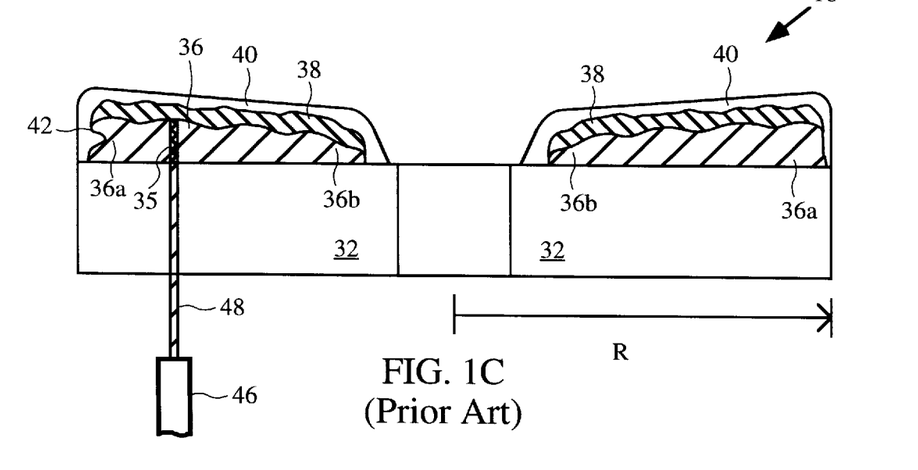
FIG. 1C is a cross sectional view of a disc spin coated using the conventional open spinning chuck/bowl apparatus of FIG. 1A.

FIG. 1C is a cross section of disc 16 of Figures 1A and 1B. In this example, a polycarbonate disc 16 is shown having the various CDR technology layers applied to the disc's surface. As described above, a solvent based chemical 36 is initially applied near an inner radius of polycarbonate disc 16 in order to spread the chemical over the top surface of the disc. As shown, the now applied solvent based chemical 36 has a wavy top surface that is believed to be a consequence of the above described turbulence effects.

Once the solvent based chemical 36 is applied over polycarbonate disc 32, polycarbonate disc 16 is removed from open spinning chuck/bowl 10 and placed into a sputtering machine where a gold material 38 is sputtered over solvent based chemical 36. As shown, gold material 38 will also exhibit undesirable microscopic non-uniformities due to the non-uniform characteristics of underlying solvent based chemical 36. Once the gold material is sputtered on, polycarbonate disc 16 is moved to another station where a suitable protective lacquer coating 40 is applied over the gold layer 38 and solvent based chemical 36. As is well known in the art, protective lacquer coating 40 serves to seal the various layers from ambient conditions and prolongs a CDR's useful life.

Once the lacquer coating 40 is applied, polycarbonate disc 16 is placed into an ultraviolet curing station where lacquer coating 40 is appropriately hardened. At this point, the core CDR fabrication steps are complete and the CDR disc may then be recorded with suitable information using a recording head 46 that applies a recording laser beam 48 to an under surface of the CDR disc. During recording, recording laser beam 48 makes direct contact with solvent based chemical 36 which changes the chemical properties of solvent based chemical 36. Accordingly, the changed chemical properties produce a recorded spot 35 which identifies a recorded event. Of course, it should be appreciated that the non-uniform wavy characteristics of solvent based chemical 36 may detrimentally affect recording and reading speeds which consequently impact a CDR disc's value.

A further disadvantage associated with spreading solvent based chemical 36 in an open bowl device is that the "solvent" component of solvent based chemical 36 immediately begins to evaporate when the bead of solvent based chemical 36 is spun over the disc's surface. Because the solvent component quickly begins to evaporate, the consistency of solvent based chemical 36 gradually becomes more viscous (i.e., thicker and less fluid). As a result, solvent based chemical 36 may exhibit a thicker chemical distribution 36a near the outer radius of the disc and a thinner chemical distribution 36b near the inner radius. In addition, a splash-back defect 42 identifies an exemplary defect that may occur when solvent based chemical 36 is deflected off the side walls of bowl frame 12.

In view of the foregoing, there is a need for methods and apparatuses for spin-coating chemicals over uniformity sensitive CDR discs. In addition, there is a need for methods and apparatuses that reduce turbulence causing ripples and premature evaporation of chemicals implemented in CDR technology.

SUMMARY OF THE INVENTION

Broadly speaking, the present invention fills these needs by providing methods and apparatuses for uniformly spin-coating chemicals over uniformity and precision sensitive CDR discs. In addition, the present invention substantially reduces turbulence within a spinning bowl chemical applicator which beneficially reduces quality deteriorating ripples, and substantially reduces premature evaporation of chemicals implemented in CDR fabrication. It should be appreciated that the present invention can be implemented in numerous ways, including as a process, an apparatus, a system, a device, or a method. Several inventive embodiments of the present invention are described below.

In one embodiment, a spinning chemical applicator for spin coating a work piece is disclosed. The spinning chemical applicator includes a bowl having a base region and substantially curved walls. A chuck base having a chuck plate for holding the work piece, the chuck base and the chuck plate contained within an inner region of the bowl. A bowl covering lid being mounted on a top surface of the substantially curved walls. A plurality of upper venting holes being defined in the substantially curved walls, the plurality of upper venting holes defining a venting path to the inner region of the bowl. And plurality of venting drain holes defined in the substantially curved walls at an edge location that is substantially below each of the plurality of upper venting holes. The plurality of venting drain holes providing a venting and drain path for the inner region of the bowl.

In another embodiment, a method for spin coating a chemical over a top surface of a disc is disclosed. The method includes placing the disc into a container. Once the disc is placed into the container, a liquid chemical bead is applied around an inner ring of the disc. Then, enclosing the disc in the container once the liquid chemical bead is applied around the inner ring of the disc. And spinning the container such that the disc is rotated up to a spin coating velocity configured to uniformly spread the liquid chemical bead throughout the top surface of the disc.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

An invention is disclosed for methods and apparatuses for uniformly spin-coating chemicals over uniformity and precision sensitive compact discs. In the following description, numerous specific details are set forth in order to provide a thorough understanding of the present invention. It will be obvious, however, to one skilled in the art, that the present invention may be practiced without some or all of these specific details. In other instances, well known process operations have not been described in detail in order not to unnecessarily obscure the present invention.

Figure 2A:
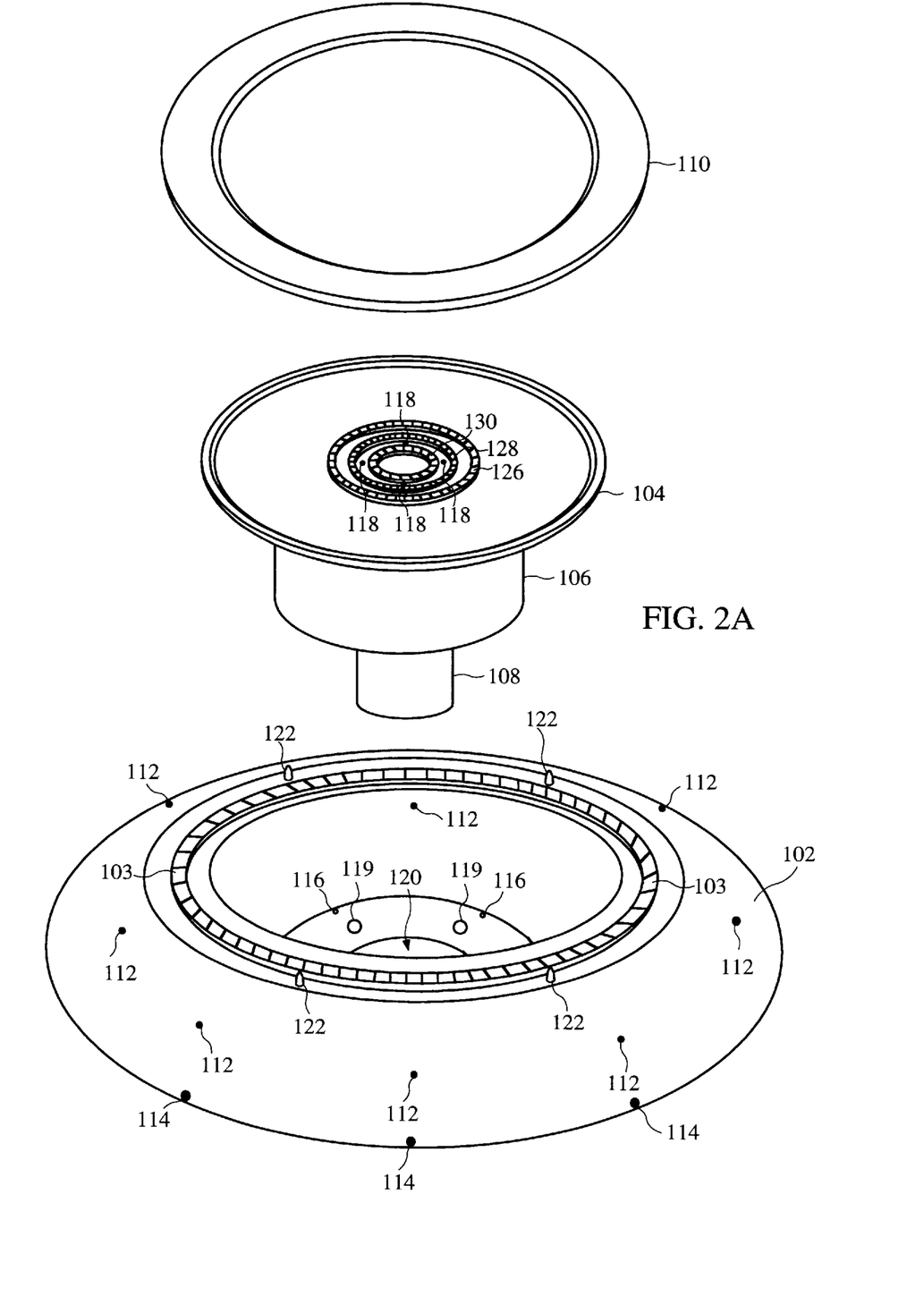
FIG. 2A is an exploded view of a spinning bowl including an internal chuck and a lid in accordance with one embodiment of the present invention.

FIG. 2A is an exploded view of a spinning bowl including an internal chuck and a lid in accordance with one embodiment of the present invention. A spinning bowl 102 is shown as a circular bowl having a hollow internal region that is accessible through a top opening. In this embodiment, a chuck base 106 and a rotation rod 108 are placed into and fixedly attached to an internal base region 121 of spinning bowl 102. By way of example, rotation rod 108 are passed through a chuck receiving hole 120 located at internal base region 121 where a chuck base 106 is securely attached to spinning bowl 102. Although any suitable attaching method may be implemented, conventional screws (now shown) passed through a set of receiving holes 119 may be used to secure chuck base 106 to spinning bowl 102. Finally, a chuck plate 104 that is preferably integrally connected to chuck base 106 is provided for holding a suitable work piece. In a preferred embodiment, the work piece is a polycarbonate disc used in the compact disc (CD) and compact disc recordable (CDR) industries. However, it should be appreciated that the various embodiments of the present invention may be equally applicable to other technologies where precision chemical spin-coating is an important requirement.

As shown, chuck plate 104 preferably has a top surface region 117 that is configured to hold a suitable polycarbonate disc. Generally, top surface region 117 includes three supporting rings near a center radius of chuck plate 104 that are used to hold a disc in a manner that protects the disc's under surface from coming into contact with top surface region 117 of chuck plate 104.

By way of example, typical polycarbonate discs include a molded protruded ring near an inner radius of its under surface. This protruded ring is generally configured to mate with the various complementary protruded rings provided as part of chuck plate 104. In this example, chuck plate 104 includes an inner protruded ring 130, a middle protruded ring 128, and an outer protruded ring 126. Thus, when a polycarbonate disc having a protruded ring is placed over chuck plate 104, the protruded ring on the polycarbonate disc may preferably sit between middle protruded ring 128 and outer protruded ring 126. In this manner, sensitive portions of the polycarbonate disc are maintained slightly above and apart from top surface region 117.

Once chuck plate 104, chuck base 106, and rotation rod 108 are inserted into chuck receiving hole 120 of spinning bowl 102, a lid 110 may be placed over spinning bowl 102 to encapsulate chuck plate 104 and chuck base 106 within spinning bowl 102. In this example, lid 110 will preferably have a circular recessed groove at its under portion (not shown for ease of explanation) which will preferably mate with a circular protruded lip 103 located at a topmost region near an opening of spinning bowl 102.

Preferably, spinning bowl 102 has a base region which is at a slight incline and wall regions which are curved and inclined at an angle towards the center of spinning bowl 102. As illustrated, spinning bowl 102 therefore resembles a saucer shape that includes curved angled walls. As will be described in greater detail below, the curved walls advantageously reduce splash-back of spun-on chemicals which may cause quality reducing non-uniformity and surface variations.

Also shown are a plurality of floor drain holes 116, which are useful in draining any excess chemicals during a spin coating process. Preferably, a total number of between about 2 and 10 drain holes may be placed about the bottom portion of spinning bowl 102. More preferably, between about 3 and 8 drain holes may be provided for ensuring proper drainage, and most preferably, about 4 equally spaced apart drain holes may be provided at the bottom portion of spinning bowl 102. Also shown are a plurality of pins 122 arranged about the top portion of spinning bowl 102 for securing lid 110 during rotation. Generally, pins 122 will appropriately mate with suitable recessed pin holes located at an under surface of lid 110. Spinning bowl 102 also includes a plurality of upper vent holes 112 arranged about a midway point of the side walls of spinning bowl 102. Further shown are a plurality of venting drain holes 114 arranged about an outer lower region of the side walls of spinning bowl 102. Generally, venting drain holes 114 are defined near a radial distance (i.e., from the center) where the curved walls of spinning bowl 102 integrally meet a base region of spinning bowl 102. It should be appreciated that upper vent holes 112 are preferably located at radial distance that is less than the radial distance of venting drain holes 114.

Preferably, a suitable diameter for upper venting holes 112 may be between about 0.5 mm and 3 mm, and more preferably, between about 0.75 mm and about 2 mm, and most preferably, about 1 mm. Further, the diameter of venting drain holes 114 may preferably be between about 0.75 mm and about 3.5 mm, and more preferably about 1.5 mm and about 2.5 mm, and most preferably, about 2 mm. In this embodiment, the slightly larger diameter of venting drain holes 114 generally ensures that the pathway is sufficient for both ventilation and draining purposes.

Figure 2B:
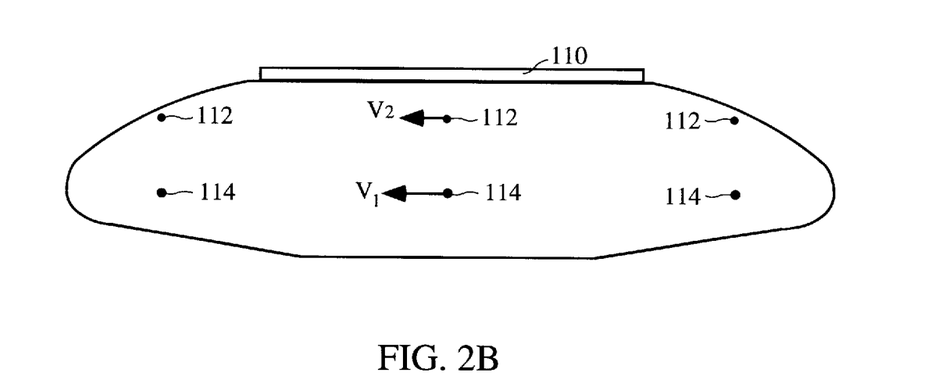
FIG. 2B is a side view of the spinning bowl of FIG. 2A more clearly illustrating the preferred curvature of the base region and side walls in accordance with one embodiment of the present invention.

FIG. 2B is a side view of spinning bowl 102 which more clearly illustrates the preferable curvature of the base region and side walls in accordance with one embodiment of the present invention. From this perspective, upper vent holes 112 are preferably designed near an upper portion of spinning bowl 102 which is radially closer to the center than venting drain holes 114. Accordingly, when spinning bowl 102 is axially rotated, the magnitude of a velocity vector $V_1$, near vent drain holes 114 will be greater than the magnitude of a velocity vector $V_2$ near upper vent holes 112. Therefore, according to Bernoulli's equation, the pressure on the outer surface of vent draining holes 114 will be lower than the pressure on the outer surface of upper venting holes 112 during a spinning operation.

As will be described in greater detail below, when a spinning operation is commenced, the pressure inside spinning bowl 102 will preferably be at atmospheric (ATM) pressure which is essentially identical to the pressure outside of spinning bowl 102. However, as the spinning operation begins to bring spinning bowl 102 to a higher rotational speed (i.e., near, but not at spin-coating speed), both upper vent holes 112 and venting drain holes 114 will begin to experience a lower pressure. As such, because the pressure inside spinning bowl 102 is lower than that on the outer surface of upper vent holes 112 and on the outer surface of venting drain holes 114, a suction effect will begin to take place wherein air contained within spinning bowl 102 is sucked out of both upper vent holes 112 and venting drain holes 114. As is well known in the art, the above described air flow will naturally occur since air generally flows from an area of high pressure to an area of low pressure.

As the rotational speed continues to increase to a stable operating speed (i.e., spin-coating speed), the pressure within spinning bowl 102 will continue to decrease since air is being sucked out from both upper vent holes 112 and venting drain holes 114. However, once the pressure within spinning bowl 102 reaches to about the same pressure present on the outer surface of upper vent holes 112, the outward flow of air will cease from upper vent holes 112. At this point, because the pressure on the outer surface of venting drain holes 114 is still lower than the pressure inside spinning bowl 102, air will continue to be sucked out from venting drain holes 114. In addition, the flow of air at upper vent holes 112 will now reverse direction and begin to suck air into the interior of spinning bowl 102. When this happens, a continual flow of air going into upper vent holes 112 and out of venting drain holes 114 will occur. Of course, if liquid chemicals are contained within spinning bowl 102, both air and liquid chemicals will be sucked out from vent drain holes 114. The advantageous turbulence reducing function of the aforementioned vent holes will be discussed in greater detail below.

Figure 2C:
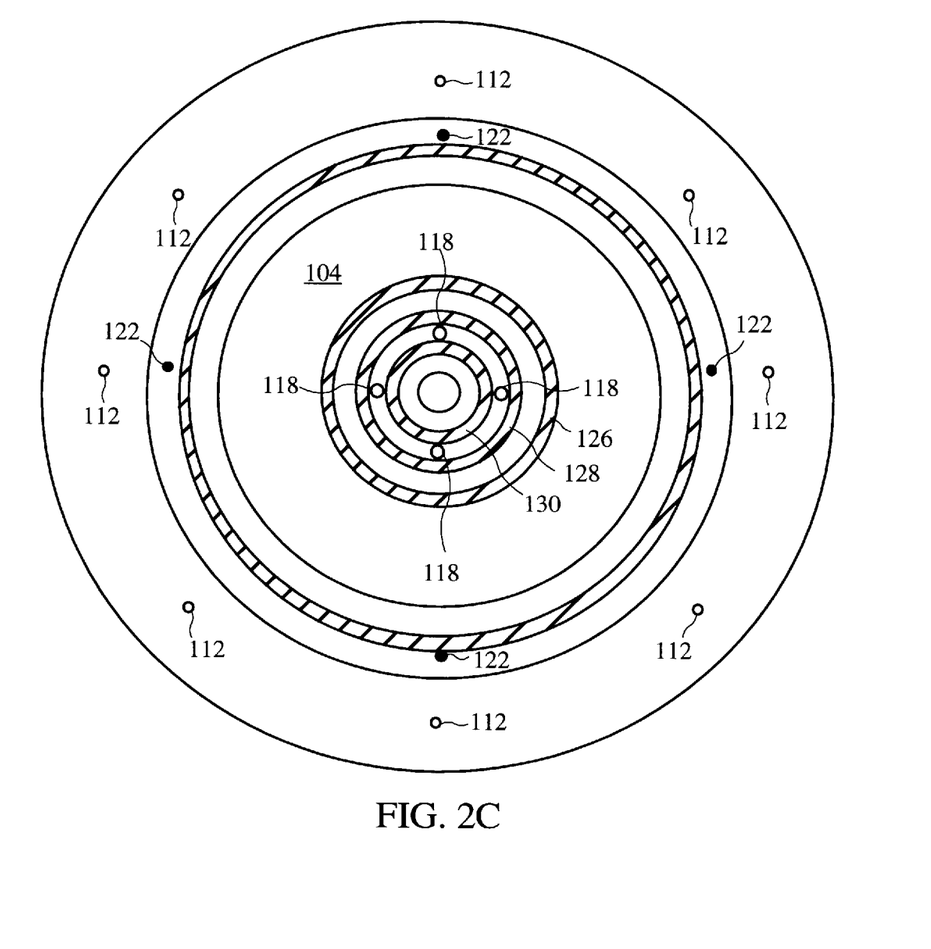
FIG. 2C is a top view of the spinning bowl of FIG. 2A once rotation rod, a chuck base, and a chuck plate are appropriately inserted within the spinning bowl in accordance with one embodiment of the present invention.

FIG. 2C is a top view of spinning bowl 102 once rotation rod 108, chuck base 106, and chuck plate 104 of FIG. 2A have been appropriately inserted through chuck receiving hole 120. As shown, the diameter of chuck plate 104 is slightly less than the opening defined by the upper region of the curved walls of spinning bowl 102. Also shown are a plurality of disc vacuum holes 118 that are defined between inner protruded ring 130 and middle protruded ring 128. In this embodiment, disc vacuum holes 118 are advantageously provided for securing a disc to chuck plate 104 during operation. In this manner, when spinning bowl 102 and chuck plate 104 is spun, the disc will also spin. As an example, disc vacuum holes 118 may be connected to a vacuum device located under spinning bowl 102 that pulls air from an under surface of a disc that may be placed over chuck plate 104.

The top view provided by FIG. 2C also illustrates the preferred placement of upper vent holes 112 that are located at about an upper midway point along the side curved walls of spinning bowl 102. In a preferred embodiment, there will preferably be a like number of upper vent holes 112 and vent drain holes 114, which may range in number between about 4 holes and about 12 holes, and more preferably, between about 6 holes and about 10 holes, and most preferably, about 8 holes, equally spaced around the curved walls of spinning bowl 102.

Figure 3:
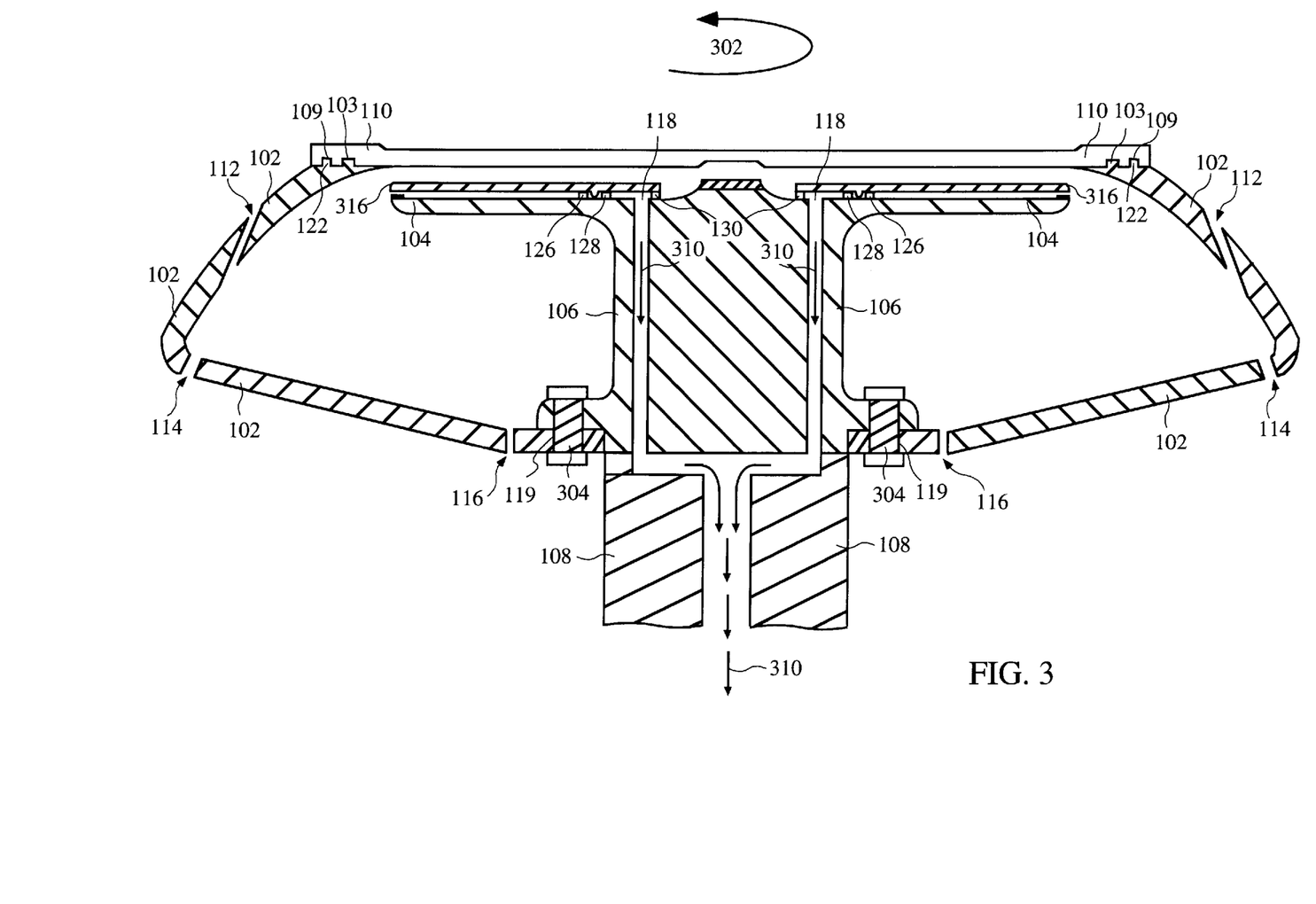
FIG. 3 shows a cross-sectional view of the spinning bowl of FIGS. 2A through 2C in accordance with one embodiment of the present invention.

FIG. 3 shows a cross-sectional view of spinning bowl 102 of FIGS. 2A through 2C in accordance with one embodiment of the present invention. As shown, lid 110 is placed over and secured to a topmost region of the walls of spinning bowl 102 which defines an opening (i.e., mouth) where a disc may be passed into spinning bowl 102. As described above, lid 110 includes a circular recess 111 which is preferably suited to mate with circular protruding lip 103 defined around the top surface of the inward-curving walls of spinning bowl 102. Also shown are pins 122 that are ensure that lid 110 is appropriately secured to spinning bowl 102 when pin holes 109 located in lid 110 are appropriately engaged to pins 122.

From this perspective, chuck base 106 is shown securedly attached to spinning bowl 102 by suitable screws 304 that are attached through screw receiving holes 118 at the base region of spinning bowl 102. In this embodiment, chuck plate 104 is shown as one integral component with chuck base 106. It should be understood that a multi-component chuck base 106 and chuck plate 104 may also be employed in accordance with an alternative embodiment of the present invention. Placed above chuck plate 104 is a polycarbonate disc 316 having a protruded ring 318 at an under portion of polycarbonate disc 316 near an inner radius.

As described above, protruded ring 318 is preferably placed between a complementary outer protruding ring 126 and middle protruding ring 328 which assists in holding polycarbonate disc 316 off of the top surface of chuck plate 104. As is well known in the art, it is critically important that the under surface of polycarbonate disc 316 remains protected throughout the fabrication process to avoid introducing scratches or any related quality deteriorating defects. In this embodiment, polycarbonate disc 316 is further shown snugly sitting (i.e., at its inter-most radius) on inner protruded ring 130, thereby creating an air pocket between inner protruded ring 130 and middle protruded ring 128. In this manner, the air pocket is created between the aforementioned rings and disc vacuum channels 118.

As described above, disc vacuum channels 118 preferably provide a vacuum suction effect as illustrated by vacuum flow lines 310. In this embodiment, the vacuum suction effect generally assists in securing polycarbonate disc 316 to chuck 104 during a spinning operation. Accordingly, when spinning bowl 102, chuck base 106, and chuck plate 104 are spun clockwise or counterclockwise, polycarbonate disc 316 will likewise spin as a unit with the entire spinning bowl 102 assembly.

From this perspective, floor drain holes 116 are shown lying at a bottom most surface of spinning bowl 102, and are preferably suited to drain any excess liquid chemical that may be applied to polycarbonate disc 316 during a chemical spin coating operation. Also clearly identified is a cross-section of upper vent holes 112 and venting drain holes 114, which provide the aforementioned airflow paths during appropriate spin-coating speeds. Rotational rod 108 is shown having disc vacuum channels 118 that extend up through chuck base 106 for securing polycarbonate disc 316 to chuck plate 104. In this embodiment, rotation rod 108 may be connected to a suitable rotation providing motor which rotates spinning bowl 102 as illustrated by an exemplary rotation indicator 302.

Figure 4A:
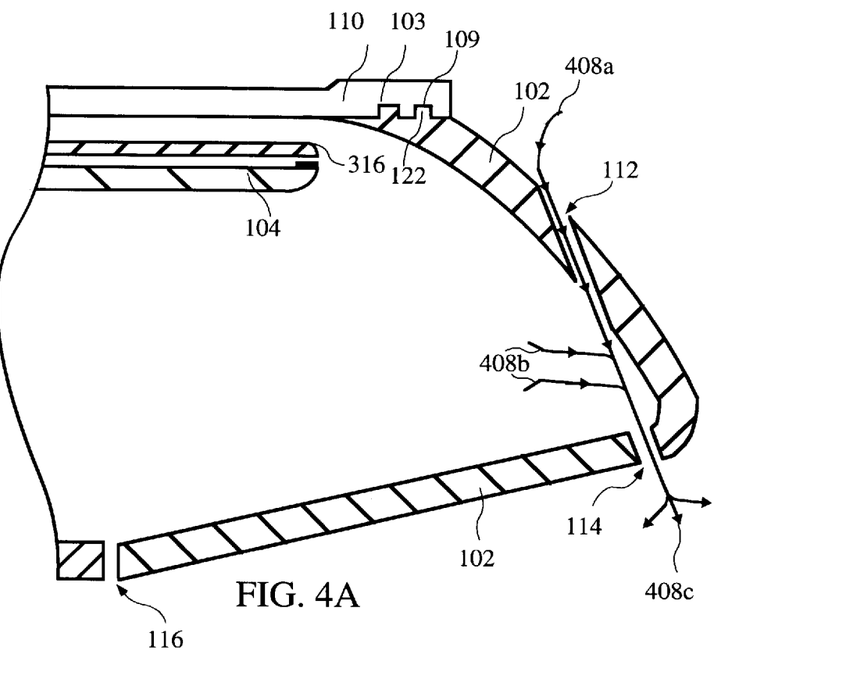
FIG. 4A shows a cross-sectional partial view of the spinning bowl of FIG. 3 showing exemplary air flow lines that may occur during operation in accordance with one embodiment of the present invention.

FIG. 4A shows a cross-sectional partial view of spinning bowl 102 and lid 110 securedly attached to spinning bowl 102 by mating circular protruding lip 103 to circular recess 111 defined within lid 110 as described above. In this example, a plurality of airflow lines are shown flowing in a preferred direction when an optimum spin coating equilibrium speed is reached. By way of example, spinning bowl 102 is said to have reached a constant spin coating equilibrium speed when preferred speeds of between about 3000 rpms and about 10,000 rpms are reached. More preferably, a constant spin coating equilibrium speed may be between about 5000 rpms and about 8500 rpms, and most preferably about 7000 rpms. Once the constant spin coating equilibrium speed is reached, airflow lines 408a (i.e., entering spinning bowl 102), 408b (i.e., flowing through spinning bowl 102) and 408c (i.e., flowing out of spinning bowl 102) are believed to advantageously reduce the disturbing turbulence currents present in prior art spin coating applicators.

As described above, because venting drain holes 114 are located at a greater radial distance from the center of spinning bowl 102 than upper vent holes 112, the magnitude of a velocity vector near the outer surface of vent drain holes 114 will be greater than the magnitude of a velocity vector near the outer surface of upper vent holes 112. Accordingly, as understood from Bernoulli's equation, the pressure on the outer surface of venting drain holes 114 will be lower than the pressure on the outer surface of upper vent holes 112. While spinning bowl 102 is spun to an equilibrium rotational speed, the internal pressure (i.e., atmospheric pressure when stationary) of spinning bowl 102 will begin to fall when air contained within spinning bowl is sucked out through both upper vent holes 112 and venting drain holes 114. The suction effect will occur because the pressure inside of spinning bowl 102 will be higher than that on the outer surface of both upper vent holes 112 and venting drain holes 114.

While spinning bowl 102 continues to spin to its equilibrium rotational speed, the pressure inside of spinning bowl 102 will also experience a continual drop in pressure. The drop in pressure inside of spinning bowl 102 is primarily due to the flow of air out of both upper vent holes 112 and venting drain holes 114. When the pressure inside spinning bowl 102 drops to about the same pressure experienced on the outer surface of upper vent holes 112, air will no longer continue to flow out of upper vent holes 112. At this point, the pressure inside spinning bowl 102 and upper vent holes 112 is still higher than that on the outer surface of venting drain holes 114. As described above, the outer surface of venting drain holes 114 will still have a lower pressure since venting drain holes 114 are located at a greater radial location than upper vent holes 112. Accordingly, while spinning bowl 102 continues to spin to its equilibrium rotational speed, the flow of air may be as illustrated by flow lines 408a, 408b and 408c.

Figure 4B:
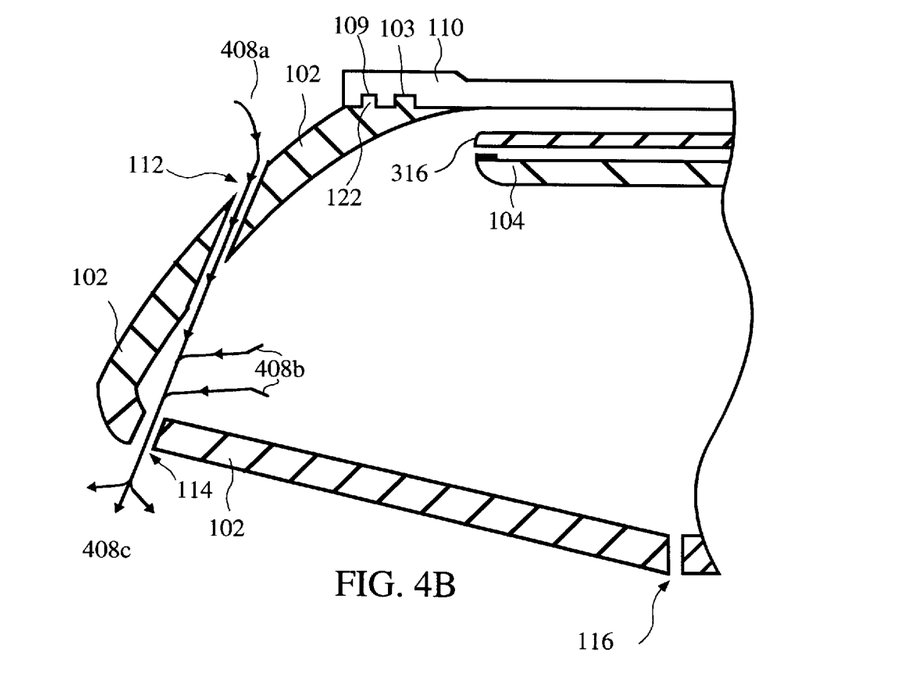
FIG. 4B shows substantially similar air flow lines occurring at a location directly across from the exemplary flow lines of FIG. 4A in accordance with one embodiment of the present invention.

FIG. 4B shows a substantially similar flow of air occurring at a location directly across from the flow lines of FIG. 4A, in accordance with one embodiment of the present invention. Although only two cross-sectional flow line views are provided for ease of description, it should be understood that substantially similar flow lines may be occurring around spinning bowl 102 at each pair of upper vent holes 112 and venting drain holes 114, respectively. It should also be appreciated that having the above-described airflow characteristics is a substantial nonobvious improvement over prior art spin coating bowl systems which are known to produce a high degree of turbulence and disruptive ripples over spin coated work pieces.

As a result, when highly sensitive solvent based chemicals are spin coated over a polycarbonate disc 316 in the process of making a CDR disc, it is believed that the resulting solvent based chemical coating may result in highly uniform coating. As described above, having a high degree of uniformity is critical in CDR technology where non-uniformities in the solvent based chemical may substantially degrade the quality and value of a CDR disc.

Figure 5:
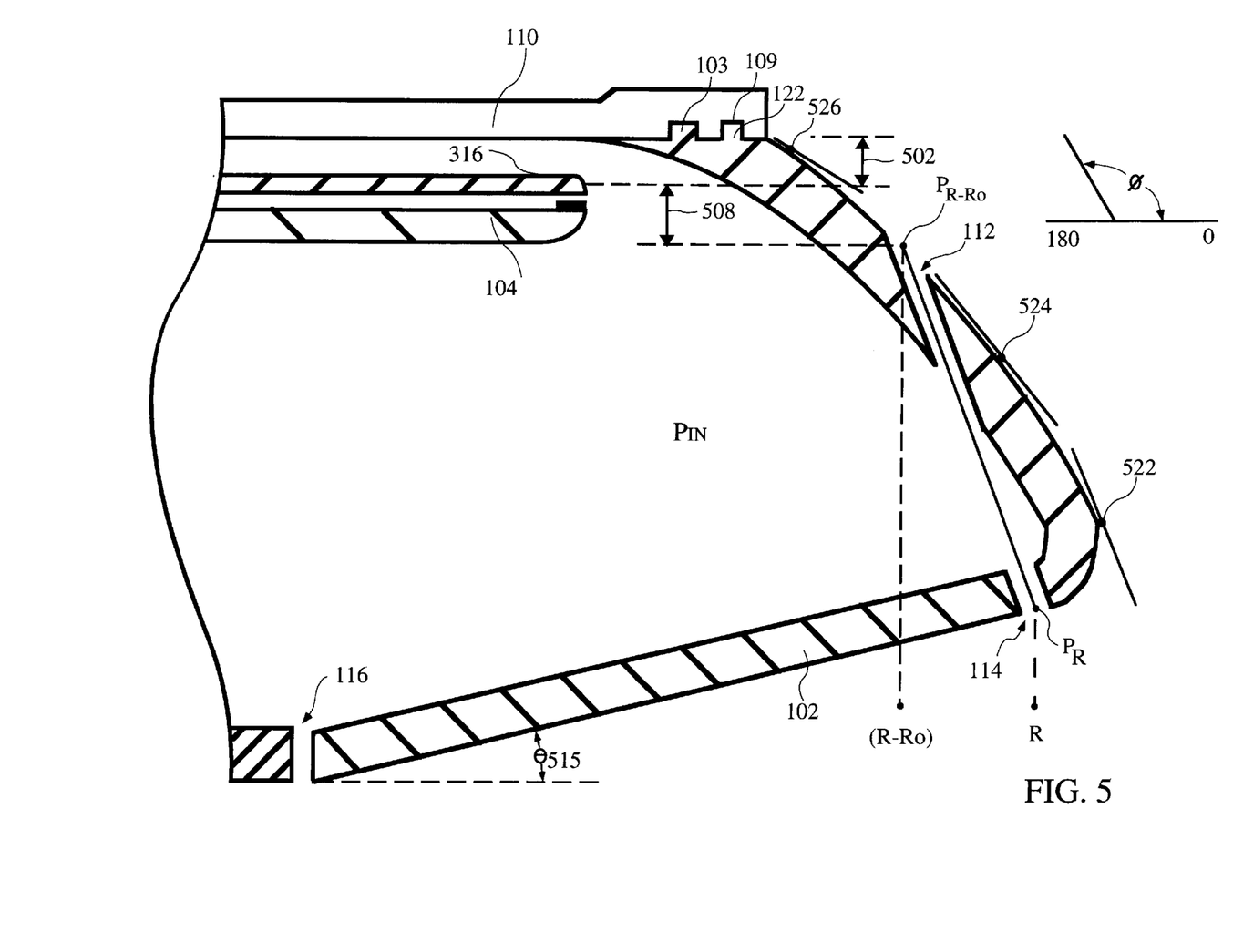
FIG. 5 shows an exploded view of a cross-sectional segment of the spinning bowl of FIG. 3 in accordance with one embodiment of the present invention.

FIG. 5 shows an exploded view of a cross-sectional segment of spinning bowl 102 in accordance with one embodiment of the present invention. In this example, venting drain holes 114 are shown being at a radius R where a pressure $P_R$ identifies the pressure on the outer surface of venting drain holes 114 when spinning bowl 102 is spinning at an equilibrium speed. Also shown is upper vent hole 112 located at a radius ($R-R_0$) which is illustrated to be a shorter radius from the center of spinning bowl 102. Thus, the pressure on the outer surface of upper vent holes 112 is shown to be $P_{R-R0}$. An exemplary radius R for pressure $P_R$ is about 116 mm, and an exemplary radius $R-R_0$ for pressure $P_{R-R0}$ is about 100 mm. Further, upper vent holes 112 preferably have an exemplary height defined from a lower most portion of the base (i.e., bottom of the center radius) of spinning bowl 102 to a vertical height of about 40 mm. Drain venting holes preferably have an exemplary height defined from a lower most portion of the base of spinning bowl 102 to a vertical height of about 25 mm.

To further define the curvature of the side walls of spinning bowl 102, a number of exemplary angles (i.e., in degrees) are identified at selected tangent locations along the side walls of spinning bowl 102. In this embodiment, an angle ($\phi$) at a tangent location 522 identified near a lower region of spinning bowl 102 is preferably between about 110 degrees and about 130 degrees. An angle ($\phi$) at a tangent location 524 identified near a middle region of spinning bowl 102 is preferably between about 140 degrees and about 150 degrees, and an angle ($\phi$) at a tangent location 524 identified near an upper most region of spinning bowl 102 is preferably between about 160 degrees and about 170 degrees. A further exemplary angle ($\phi$) defined by a line 520 extending from a point at $P_R$ to a point at $P_{R-R0}$ is preferably about 115 degrees. It should be appreciated that line 520 preferably defines an angle for the flow of air as described with reference to FIGS. 4A and 4B.

It should also be understood that the above identified angles are merely exemplary and other suitable angles may be used without departing from the spirit and scope of the present invention. In addition, the described wall curvature is advantageously suited to substantially prevent splash-back during the spin coating of polycarbonate disc 316 with the aforementioned solvent based chemical. As such, this curvature has been found to work well in reducing splash-back while also maintaining the physical size of spinning bowl 102 to a reasonable overall diameter.

Still referring to FIG. 5, an angle ($\theta_{515}$) is shown defining a preferred angle for a portion of the base region of spinning bowl 102. In this embodiment, $\theta_{515}$ is preferably between about 5 degrees and about 25 degrees, and more preferably, between about 7.5 degrees and about 15 degrees, and most preferably, about 10 degrees. Further, it is preferred that polycarbonate disc 316 be maintained at a height that is at least higher than upper vent holes 112 as shown by a distance 508. In a preferred embodiment, distance 508 is preferably greater than at least about 9 mm, and more preferably at least about 11 mm to avoid placing the top surface of polycarbonate disc 316 in the path of the above described air flow.

Accordingly, chuck plate 104 preferably maintains polycarbonate disc 316 near lid 110 to substantially prevent the disruption of a spin-coating operation by the air flowing through upper vent holes 112 and venting drain holes 114. In this embodiment, a distance 502 extending from polycarbonate disc 316 to the under surface of lid 110 is preferably about 4 mm. Preferable distance 502 has been found to work particularly well since closer distances may produce condensation on the under surface of lid 110. When condensation begins to occur, droplets may begin to form on the under surface of lid 110 which may cause non-uniformities to the solvent based chemical that is being spin coated over polycarbonate disc 316.

Spinning bowl 102 is preferably made out of suitable aluminum materials or alloys having a wall thickness of between about 2 mm and about 8 mm, and more preferably, between about 2.5 mm and about 5 mm, and most preferably, about 3 mm. Accordingly, a preferred weight of spinning bowl 102, chuck base 106, chuck plate 104 and lid 110 is between about 2 pounds and about 10 pounds, and more preferably, between about 2.5 pounds and about 5 pounds, and most preferably, about 3 pounds. Further, a preferred diameter of spinning bowl 102 is about 250 mm, however, it should be borne in mind that the provided dimensions are merely exemplary.

In a further embodiment, when spinning bowl 102 is in operation, lid 110 is preferably secured to the top ridge of the walls of spinning bowl 102. Advantageously, having a "closed" bowl arrangement also assists in reducing the rate at which the solvent based chemical evaporates. As described with reference to FIG. 1A, the "solvent" component of the solvent based chemical has a tendency to prematurely evaporate while the solvent based chemical is being spread on the outer radius portions of polycarbonate disc 316. Accordingly, lid 110 of spinning bowl advantageously assists in reducing the rate at which the "solvent" component of the solvent based chemical evaporates. As such, since the solvent component is prevented from excessive evaporation, the viscosity of the solvent based chemical is maintained having a more uniform consistency as it is spread over the surface of polycarbonate disc 316 in spinning bowl 102.

Figure 6A:
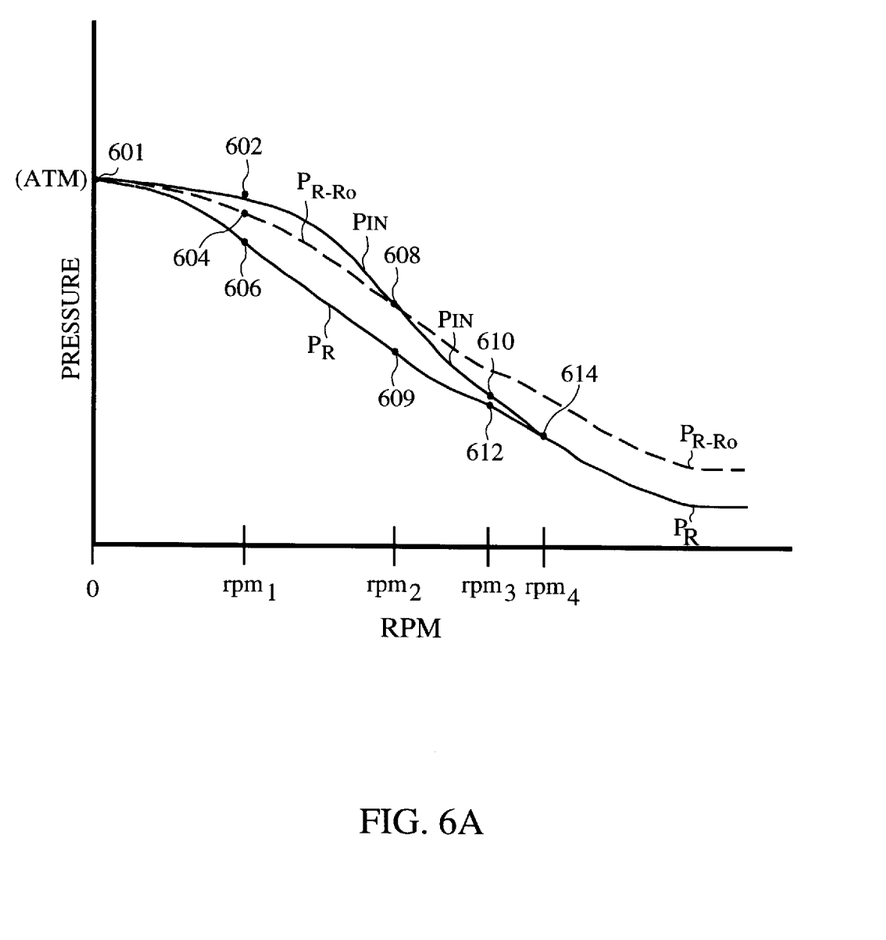
FIG. 6A is a pressure versus rpm graph of the pressure characteristics at various locations of the spinning bowl of FIG. 3 in accordance with one embodiment of the present invention.

FIG. 6A is a pressure versus rpm graph of the pressure characteristics at various locations of spinning bowl 102 as rotational acceleration increases in accordance with one embodiment of the present invention. Initially, when spinning bowl 102 is at a rest position, the pressure inside and outside of spinning bowl is substantially at atmospheric pressure (ATM) as shown by a point 601. As spinning bowl begins gain rotational acceleration, the pressure at $P_R$ (as shown in FIG. 5) begins to drop as understood by Bernoulli's equation. Accordingly, an exemplary curve for pressure $P_R$ is shown to drop as rpm increases. At an $rpm_1$, a point 606 identifies the pressure $P_R$ being lower than the pressure at a point 604 that identifies the pressure on a curve $P_{R\text{-}R0}$. As described above, the pressure characteristics associated with the curve $P_{R\text{-}R0}$ identify the pressure variations believed to occur on the outer surface of upper vent holes 112.

Because the pressure shown at points 604 and 606 are both below the pressure within spinning bowl 102 identified by a curve $P_{IN}$, a suction effect will occur at both upper vent holes 112 and venting drain holes 114. Of course, as suction continues in an outward direction drawing air out of the interior of spinning bowl 102, the pressure within spinning bowl 102 will also continue to drop as shown by a point 602.

As rpms continue to increase up to $rpm_2$, the pressure at point $P_R$ is shown at a point 609. However, the pressure inside of spinning bowl 102 will continue to drop due the suction effect occurring at both upper vent holes 112 and venting drain holes 114. Accordingly, at a point 608 both the pressure inside (i.e., $P_{IN}$) of spinning bowl 102 and the pressure on the outer surface of upper vent holes 112 (i.e., $P_{R\text{-}R0}$) will reach a substantially equal pressure. When this happens, suction out of spinning bowl 102 from upper vent holes 112 will cease, and suction will only remain at venting drain holes 114. At this point, as the rotational speed continues to increase towards $rpm_3$, the pressure inside of spinning bowl 102 will now be lower than the pressure on the outer surface of upper vent holes 112 as illustrated by the various curves. Therefore, suction at upper vent holes 112 will reverse and air will now begin to be sucked into spinning bowl 102.

As illustrated, the pressure on the outer surface of venting drain holes 114 is still lower than the pressure inside spinning bowl 102 and on the outer surface of upper vent holes 112. Accordingly, it is believed that air will continue to flow out of venting drain holes 114 while air is being suctioned into spinning bowl 102 from upper vent holes 112. In a preferred embodiment, appropriate spin coating speeds may be between about $rpm_2$ and about $rpm_3$. By way of example, it is preferred that the pressure on the outer surface of venting drain holes 114 (i.e., $P_R$) is lower than that at both the outer surface of upper vent holes 112 (i.e., $P_{R\text{-}R0}$) and the internal region of spinning bowl 102 (i.e., $P_{IN}$). In this manner, the preferred flow into spinning bowl 102 from upper vent holes 112 and out of venting drain holes 114 is maintain. Of course, it should be appreciated that during operation, any excess spun on chemicals may also be drained through venting drain holes 114 as well as floor drain holes 116.

Figure 6B:
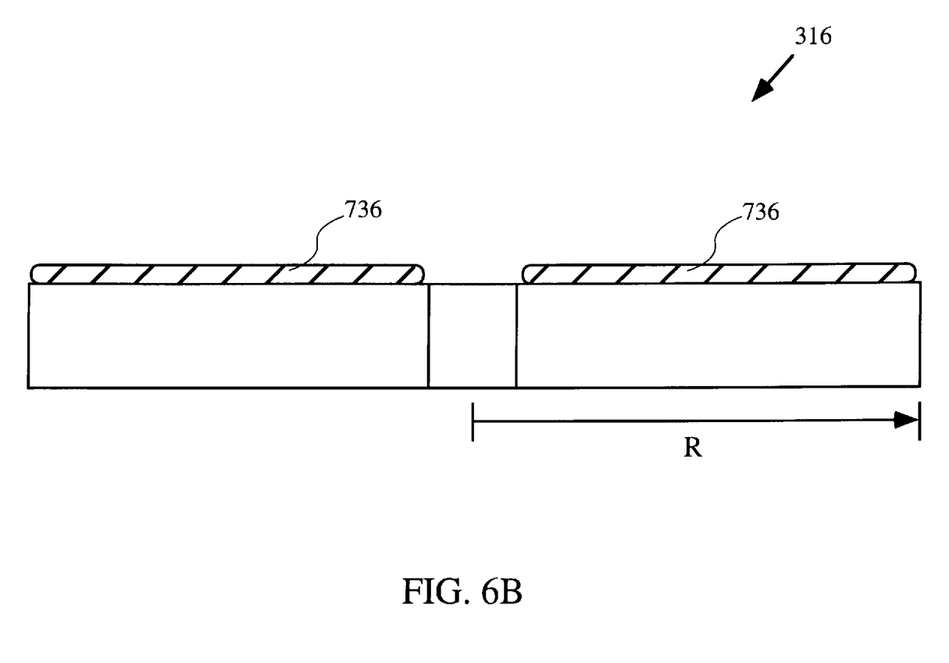
FIG. 6B shows an exemplary disc having a uniformly applied chemical over its top surface in accordance with one embodiment of the present invention.

FIG. 6B shows a polycarbonate disc 316 that may be used to fabricate a suitable compact disc recordable (CDR) disc in accordance with one embodiment of the present invention. In this embodiment, polycarbonant disc 316 is shown after a solvent based chemical 736 is uniformly applied in a closed lid spinning bowl 102. As described above, it is believed that the inventive upper vent holes 112 and corresponding venting drain holes 114 of the present invention advantageously assist in reducing turbulent disrupting air flows within spinning bowl 102 during a spin coating application of solvent based chemical 736.

Accordingly, solvent based chemical 736 is shown as a substantially uniform coated layer. In addition, because the inventive closed bowl arrangement has proven to reduce premature evaporation of the "solvent" component in solvent based chemical 736 which advantageously maintains a constant viscosity during its application. As a consequence, recording and reading operations may be performed more rapidly, making CDR discs spin coated in the inventive spinning bowl 102 more valuable and desirable.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A spinning chemical applicator for spin coating a work piece, comprising:

a bowl having a base region and substantially curved walls;

a chuck base having a chuck plate for holding the work piece, the chuck base and the chuck plate contained within an inner region of the bowl;

a bowl covering lid being mounted on a top surface of the substantially curved walls;

a plurality of upper venting holes being defined in the substantially curved walls, the plurality of upper venting holes defining a venting path to the inner region of the bowl; and a plurality of venting drain holes defined in the substantially curved walls at an edge location that is substantially below each of the plurality of upper venting holes, the plurality of venting drain holes providing a venting and drain path for the inner region of the bowl.

2. A spinning chemical applicator for spin-coating a work piece as recited in claim 1, wherein the plurality of upper venting holes and the plurality of venting drain holes are substantially vertically aligned with each other.

3. A spinning chemical applicator for spin-coating a work piece as recited in claim 2, wherein the plurality of venting drain holes are located at a first radial distance that is greater than a second radial distance associated with the plurality of upper venting holes.

4. A spinning chemical applicator for spin-coating a work piece as recited in claim 2, wherein the edge location of the plurality of venting drain holes is defined substantially near an intersection of the substantially curved walls and the base region of the bowl.

5. A spinning chemical applicator for spin-coating a work piece as recited in claim 2, wherein the chuck base contains a plurality of work piece vacuum channels that extend from under the base region of the bowl to the chuck plate.

6. A spinning chemical applicator for spin-coating a work piece as recited in claim 2, wherein the plurality of work piece vacuum channels are connected to a vacuum pump.

7. A spinning chemical applicator for spin-coating a work piece as recited in claim 1, wherein the plurality of upper venting holes and the plurality of venting drain holes are vertically offset with each other.

8. A spinning chemical applicator for spin-coating a work piece as recited in claim 1, wherein the plurality of upper venting holes are at least vertically lower than the chuck plate.

9. A spinning chemical applicator for spin-coating a work piece as recited in claim 1, wherein the substantially curved walls have a progressively increasing angle of curvature extending from the top surface of the substantially curved walls to the edge location.

10. A spinning chemical applicator for spin-coating a work piece as recited in claim 9, wherein the top surface of the substantially curved walls has an angle of between about 160 degrees and about 170 degrees.

11. A spinning chemical applicator for spin-coating a work piece as recited in claim 9, wherein the edge location has an angle of between about 110 degrees and about 130 degrees.

12. A spinning chemical applicator for spin-coating a work piece as recited in claim 9, wherein a surface location on the substantially curved walls lying between about the top surface of the substantially curved walls and the edge location has an angle of between about 140 degrees and about 150 degrees.

13. A spinning chemical applicator for spin-coating a work piece as recited in claim 9, wherein the progressively increasing angle of curvature is defined between about 110 degrees and about 170 degrees.

14. A spinning chemical applicator for spin-coating a work piece as recited in claim 1, wherein the bowl covering lid contains a substantially circular recess configured to mate with a substantially cylindrical protrusion defined on the a top surface of the substantially curved walls.

15. A spinning chemical applicator for spin-coating a work piece as recited in claim 14, wherein the bowl covering lid contains a plurality of pins configured to mate with a plurality of receiving pin holes defined on the top surface of the substantially curved walls.

16. A spinning chemical applicator for spin-coating a work piece as recited in claim 1, wherein a space between the bowl covering lid and the chuck plate is between about 2 mm and 10 mm.

17. A spinning chemical applicator for spin-coating a work piece as recited in claim 1, wherein a space between the bowl covering lid and the chuck plate is between about 3 mm and 6 mm.

18. A spinning chemical applicator for spin-coating a work piece as recited in claim 1, wherein the plurality of upper venting holes have a smaller diameter than the plurality of venting drain holes.

19. A spinning chemical applicator for spin-coating a compact disc, comprising:
  a bowl having a base region and substantially curved walls;
  a chuck base having a chuck plate for holding the compact disc, the chuck base and the chuck plate contained within an inner region of the bowl;
  a bowl covering lid being mounted on a top surface of the substantially curved walls;
  a plurality of upper venting holes being defined in the substantially curved walls, the plurality of upper venting holes defining a venting path to the inner region of the bowl; and
  a plurality of venting drain holes defined in the substantially curved walls at an edge location that is substantially below each of the plurality of upper venting holes, the plurality of venting drain holes providing a venting and drain path for the inner region of the bowl.

20. A method for uniformly spin-coating a chemical over a work piece, comprising:
  (a) providing a bowl having a base region and substantially curved walls, the substantially curved walls defining an opening for receiving the work piece, the work piece being placed on a chuck attached to the base region of the bowl;
    (i) wherein the bowl contains a plurality of upper venting holes defined in the substantially curved walls, the plurality of upper venting holes defining a venting path to the inner region of the bowl;
    (ii) wherein the bowl contains a plurality of venting drain holes defined in the substantially curved walls at an edge location that is substantially below each of the plurality of upper venting holes, and the plurality of venting drain holes provide a venting and drain path for the inner region of the bowl;
  (b) placing a lid over the bowl once the chemical is applied on the surface of the work piece, the work piece being secured to the chuck that is attached to the base region of the bowl; and
  (c) spinning the bowl to a chemical spin-coating speed.

21. A method for uniformly spin-coating a chemical over a work piece as recited in claim 20, wherein when the chemical spin-coating speed is reached, a stream of air is pulled into the inner region of the bowl through the plurality of upper venting holes and is simultaneously pulled out of the inner region of the bowl through the plurality of venting drain holes.

22. A method for uniformly spin-coating a chemical over a work piece as recited in claim 21, wherein the plurality of venting drain holes are located at a first radial distance that is greater than a second radial distance associated with the plurality of upper venting holes.

23. A method for uniformly spin-coating a chemical over a work piece as recited in claim 22, wherein when the bowl is at the chemical spin-coating speed, the first radial distance has a lower pressure than the second radial distance.

24. A method for uniformly spin-coating a chemical over a work piece as recited in claim 23, wherein turbulence is reduced when the stream of air is pulled into the inner region of the bowl through the plurality of upper venting holes and is simultaneously pulled out of the inner region of the bowl through the plurality of venting drain holes.

25. A method for uniformly spin-coating a chemical over a work piece as recited in claim 24, wherein the step of placing the lid over the bowl reduces evaporation of the chemical during a time lapsed to reach the chemical spin-coating speed.

26. A method for uniformly spin-coating a chemical over a work piece as recited in claim 20, wherein the work piece is a compact disc.

27. A method for uniformly spin-coating a chemical over a work piece as recited in claim 26, wherein the compact disc is a compact disc recordable (CDR).

28. A method for uniformly spin-coating a chemical over a work piece as recited in claim 27, wherein the chemical is a die chemical that is substantially uniformly distributed over a surface of the compact disc recordable.

29. An applicator for spin coating a compact disc, comprising:
- a bowl that is configured to receive the compact disc, and has substantially curved walls;
- a plurality of upper venting holes being defined in the substantially curved walls, the plurality of upper venting holes defining a venting path to the inner region of the bowl; and
- a plurality of venting drain holes defined in the substantially curved walls at an edge location that is substantially below each of the plurality of upper venting holes, the plurality of venting drain holes providing a venting and drain path for the inner region of the bowl.

30. An applicator for spin coating a compact disc as recited in claim 29, wherein the plurality of upper venting holes and the plurality of venting drain holes are substantially vertically aligned with each other.

\* \* \* \* \*